United States Patent
Trachewsky

(10) Patent No.: US 8,170,477 B2
(45) Date of Patent: May 1, 2012

(54) ROBUST WIRELESS COMMUNICATION DEVICE

(75) Inventor: Jason A. Trachewsky, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1062 days.

(21) Appl. No.: 12/062,982

(22) Filed: Apr. 4, 2008

(65) Prior Publication Data

US 2009/0253451 A1    Oct. 8, 2009

(51) Int. Cl.
*H04B 7/14* (2006.01)
*H04M 1/00* (2006.01)

(52) U.S. Cl. .............. 455/18; 455/16; 455/17; 455/436; 455/439; 455/442

(58) Field of Classification Search .................. 455/436, 455/439, 442, 18, 16, 17
See application file for complete search history.

(56) References Cited

U.S. PATENT DOCUMENTS

| | | | | |
|---|---|---|---|---|
| 5,613,219 A * | 3/1997 | Vogel et al. | ...................... | 455/78 |
| 6,044,254 A * | 3/2000 | Ohta et al. | ...................... | 455/272 |
| 6,898,414 B2 * | 5/2005 | Ekl et al. | ...................... | 455/3.05 |
| 7,164,889 B2 * | 1/2007 | Itoh | .................................. | 455/69 |
| 7,664,093 B2 * | 2/2010 | Miyanaga et al. | ............. | 370/350 |
| 7,684,527 B2 * | 3/2010 | Yokoyama | ..................... | 375/347 |
| 2007/0123261 A1 * | 5/2007 | Black | ............................ | 455/436 |

\* cited by examiner

*Primary Examiner* — Yuwen Pan
(74) *Attorney, Agent, or Firm* — Garlick & Markison

(57) ABSTRACT

A wireless communication device includes a first receiver section and a second receiver section. The first receiver section receives a first probe signal from a first transceiver at time t1. The second receiver section receives a second probe signal from a second transceiver at time t2, wherein the first and second probe signals have substantially similar carrier frequencies. The first receiver section then receives a first signal from the first transceiver and the second receiver section receives a second signal from the second transceiver in accordance with an adjusted delay. The first and second signals have similar content and have substantially similar carrier frequencies. The adjust delay corresponds to a delta time that is substantially equal to a difference between the time t1 and the time t2 when the difference between the time t1 and the time t2 compares unfavorably to a delay threshold.

15 Claims, 7 Drawing Sheets

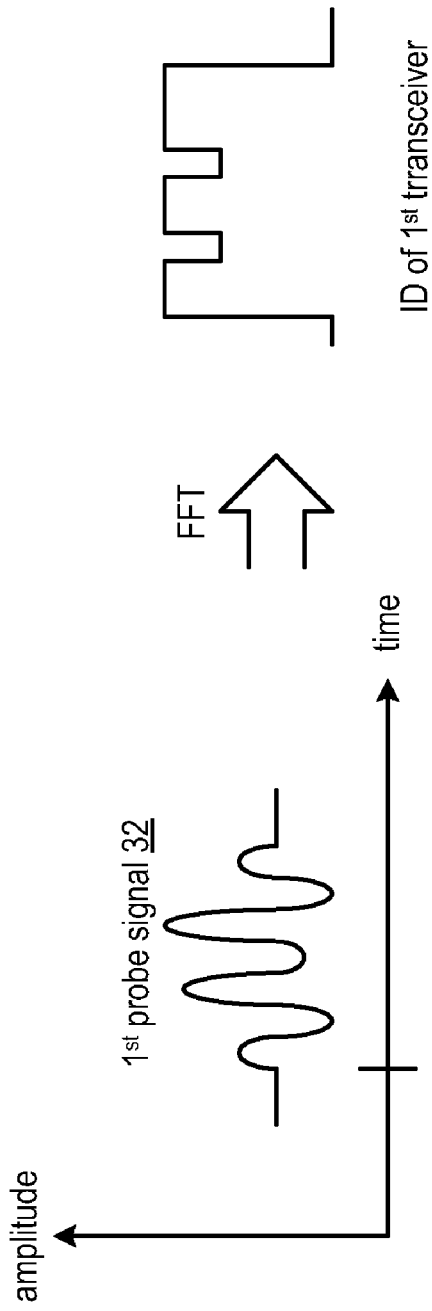
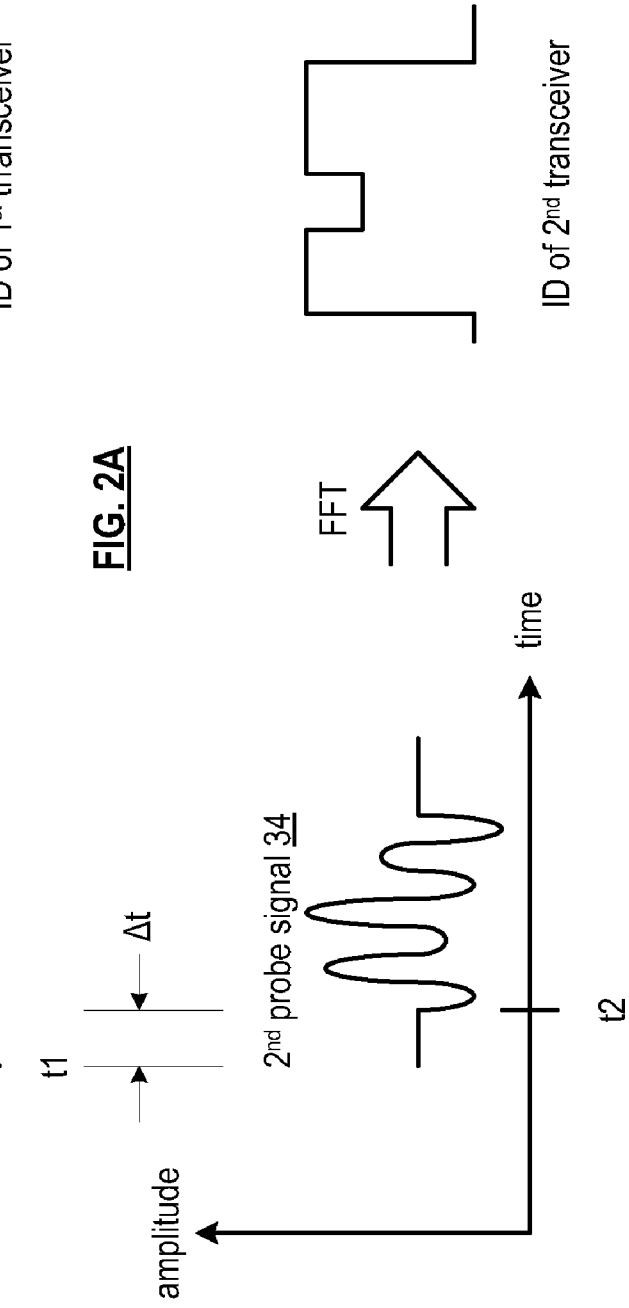
FIG. 2A
FIG. 2B

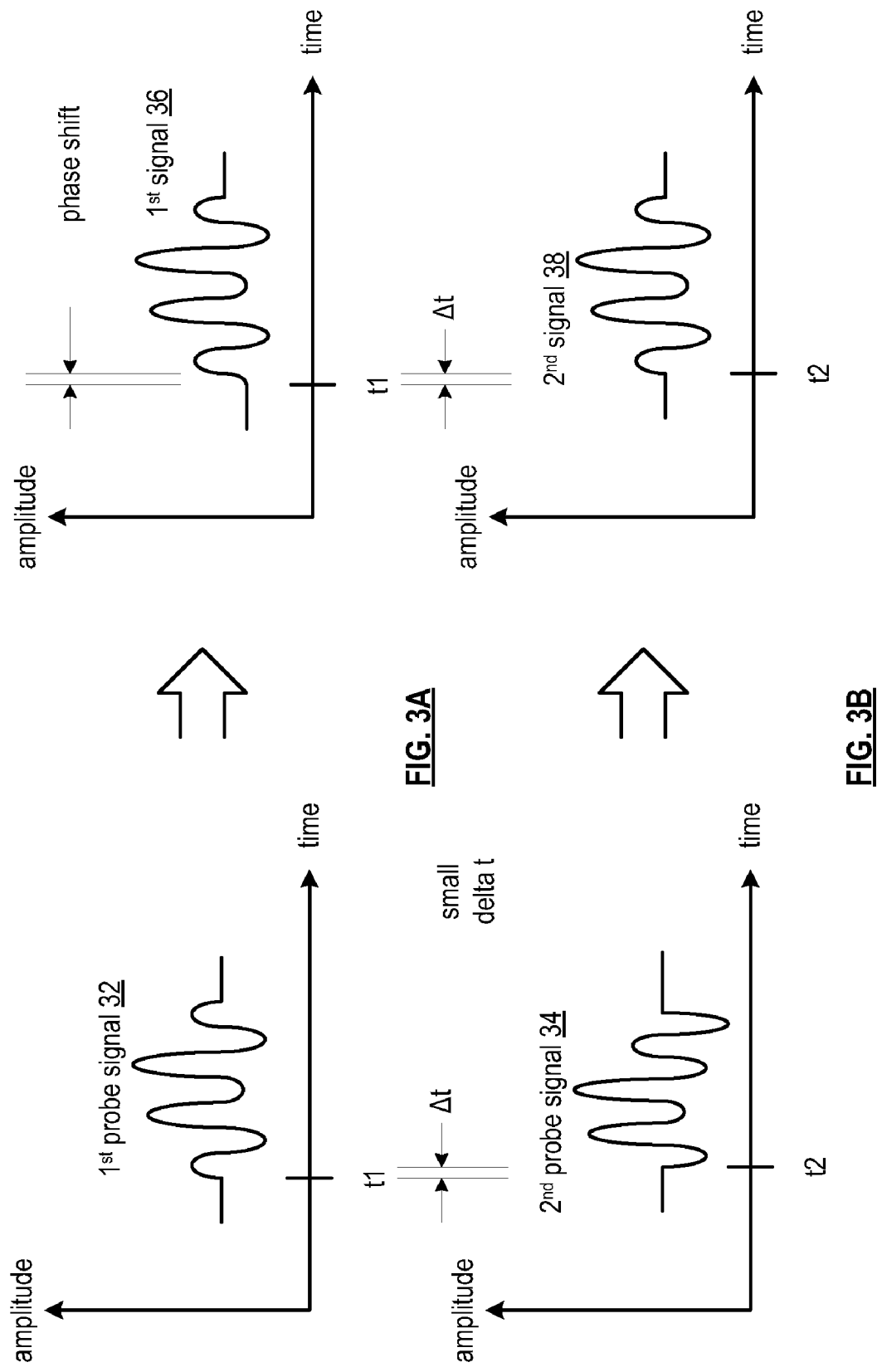

ROBUST WIRELESS COMMUNICATION DEVICE

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to improved communications within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In general, for direct or indirect wireless communications, a wireless device communicates with one other device at a time (e.g., another wireless device for a direct communication and an access point or base station for an indirect communication). For an indirect communication, a wireless communication device is registered with a single access point or a single base station even though it may be in range of multiple access points or base stations. As such, when a communication is active, the wireless communication device communicates with its access point or base station. Thus, the communication is susceptible to the various factors (e.g., interferers, multi-path fading, etc.) that adversely affect the communication.

Therefore, a need exists for a method and apparatus of improving communications within a wireless communication system.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIGS. 2A and 2B are diagrams of an example of probe signals in accordance with the present invention;

FIGS. 3A and 3B are diagrams of another example of probe signals in accordance with the present invention;

DETAILED DESCRIPTION OF THE INVENTION

Figure 1:
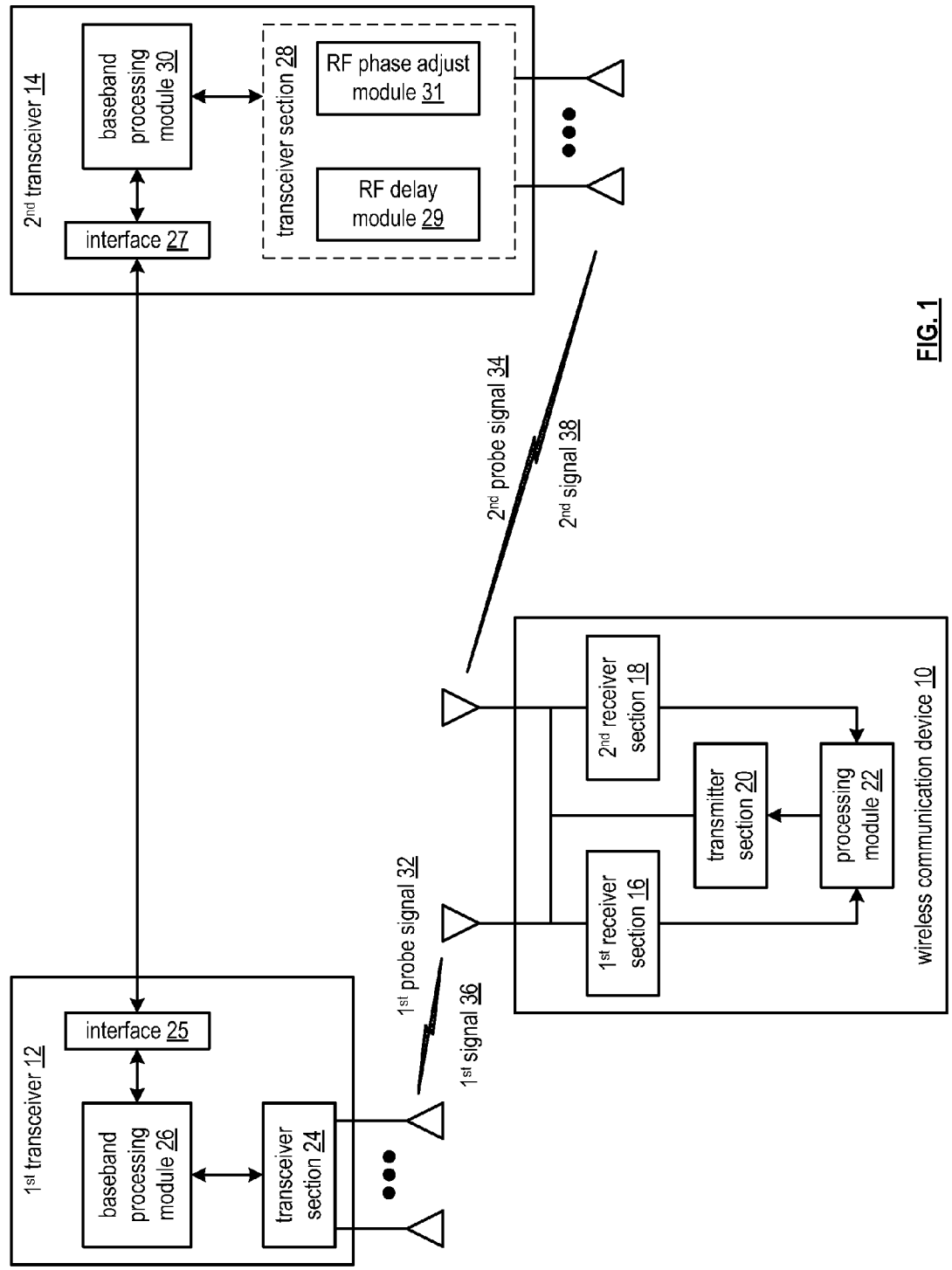
FIG. 1 is a schematic block diagram of an embodiment of a communication system in accordance with the present invention.

FIG. 1 is a schematic block diagram of an embodiment of a communication system that includes a wireless communication device 10 and a plurality of transceivers 12 and 14. The wireless communication device 10 includes a processing module 22, a transmitter section 20, first and second receiver sections 16 and 18 and an antenna structure, which may include one or more on-chip and/or off-chip antennas. Each of the transceivers 12 and 14 includes a baseband processing module 26, 30, a transceiver section 24, 28, an interface 35, 27, and an antenna section that includes one or more antennas. Each of the transceiver sections 24, 28 may include a radio frequency (RF) delay module 29 and/or an RF phase adjust module 31.

The processing module 22 and the baseband processing modules 26 and 30 may each be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. Each of the processing modules may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-10.

In the embodiment of FIG. 1, the wireless communication device 10, which may be a cellular telephone, personal computer, laptop computer, personal digital assistant, a wireless local area network (WLAN) station, etc., is within range of the first and second transceivers 12 and 14. The transceivers 12 and 14 (which may be access points in a WLAN, Bluetooth enabled devices in a piconet, and/or base stations in a cellular network) generate the first and second probe signals 32 and 34 by generating a baseband probe signal within the baseband processing module 26 or 30. The baseband probe signal may be a BPSK or QPSK signal that includes a pattern that may be recognized by a match filter in the wireless communication device 10.

The transceiver section 24 or 28 converts the baseband probe signal into a probe signal 32 or 34 and transmits it. The probe signals 32 and 34 may be the same radio frequency signal having a particular pattern to identify itself as a probe signal or may be a unique signal for each transceiver such that the pattern of the signal identifies it as a probe signal and further identifies the transceiver that transmitted it. While transmitting the probe signals 32 and/or 34, the RF delay module 29 and/or an RF phase adjust module 31 are by-passed or inactivated.

The first receiver section 16 (embodiments of which will be described with reference to FIGS. 7-10) receives the first probe signal 32 and the second receiver section 18 receives the second probe signal 34. Note that the first and second probe signals 32 and 34 may have substantially similar carrier frequencies (e.g., the same channel, or channels, in a licensed or unlicensed frequency spectrum. The first receiver section 16, or the processing module 22, time stamps the reception of the first probe signal 32, which may be represented as time t1. Similarly, the second receiver section 18, or the processing module 22, time stamps the reception of the second probe signal 34, which may be represented as time t2. Note that the wireless communication device may include a global positioning system (GPS) receiver to provide a clock source for the time stamping or the device may utilize an internally generated clock source for the timing stamping.

In one embodiment, the processing module 22 interprets the first and second times t1 and t2 to establish a time difference (e.g., $\Delta t = t1 - t2$). The processing module 22 compares the time difference to a delay threshold (e.g., less than $\lambda/c$, which corresponds to the time of one wavelength of the first or second probe signal, wherein $\lambda$ is the wavelength of the first and/or second probe signal and c is the speed of light). When the comparison is unfavorable, the processing module 22 generates an adjust signal that is provided to the first or the second transceiver 12 or 14.

The transceiver section 24 or 28 of the first or the second transcevier 12 or 14 receives the adjust signal as a response to the probe signal. The transceiver section 24 or 28 converts the response signal into a baseband response signal. The baseband processing module 26 or 30 interprets the baseband response signal to determine a delta time (e.g., the time difference). The baseband processing module 26 or 30 utilizes the delta time to delay the generation of a symbol stream that is converted to the first or second signal 36 or 38 by the transceiver section 26 or 30 or delays the transmission of the first or the second signal 36 or 38. In this manner, the wireless communication device 10 receives the first and second signals 36 and 38 at substantially the same time. With the first and second signals having substantially the same carrier frequency and the same content (e.g., preamble, header, and data sections), the wireless communication device 10 receives essentially the same signal twice from two different sources at the same time. In this instance, the cumulative signals improve the wireless communication device's ability to recapture the data embedded in the signals 36 and 38.

In another embodiment, the wireless communication device 10 transmits the first and second times t1 and t2 to the first or second transceiver 12 or 14 based on which probe signal 32 or 34 was received first. For example, if the first probe signal 32 was received first, the wireless communication device 10 transmits the first and second times t1 and t2 to the first transcevier 12. The first or second transceiver 12 or 14 utilizes the first and second times t1 and t2 to determine a delay period, which is the amount of time the first or second transceiver delays the transmission of its signal 36 or 38 from the transmission by the other transcevier of its signal 38 or 36. To facilitate the coordination of the first and second transceivers transmissions, they each include an interface 25 and 27 that supports a direct connection between the transceivers. The direct connection may be a serial connection, a parallel connection, a standardized connection (e.g., USB, I2S, T1, optical connection, RS232, etc.), or a proprietary connection.

In another embodiment, the baseband processing module 26 or 30 interprets the baseband response signal to determine a delta time (e.g., the time difference). In addition, the baseband processing module 26 or 30 converts outbound data into an outbound symbol stream. The transceiver section 26 or 30 converts the outbound symbol stream into an outbound RF signal. The RF delay module 29 and/or an RF phase adjust module 31 convert the outbound RF signal into the first or second signal 36 or 38 based on the delta time. For example, when the comparison of the time difference (e.g., the delta time) to the delay threshold is unfavorable, the processing module 22 provides the adjust signal to the RF delay module 29, which may be an adjustable delay line. Based on the adjust signal, the RF delay module 29 delays transmission of the outbound RF signal as the first or second signal 36 or 38 by the delta time. In addition, the processing module 22 may provide a component of the adjust signal to the RF phase adjust module 31, which adjusts the phase of the first or second signal 36 or 38.

As another example, when the comparison of the time difference (e.g., the delta time) to the delay threshold is favorable, the processing module 22 provides the adjust signal to the RF phase adjust module 31, which adjusts the phase of the first or second signal 36 or 38. In an embodiment, the RF phase adjust module 31 may be an antenna interface that provides the outbound RF signal to at least two orthogonal antennas to provide in air spatial combining. For example, if the outbound RF signal is expressed as $A_0 \cos(\omega_{rf}(t))$ and is provided to a first antenna having a zero degree polarization and to second antenna having a ninety degree polarization, the first antenna will transmit the outbound RF signal as $A_0 \cos(\omega_{rf}(t))$ and the second antenna will transmit the outbound RF signal as $A_0 \sin(\omega_{rf}(t))$. When the signals are combined in air, the resulting signal 36 or 38 is $1.414 A_0 \cos(\omega_{rf}(t)+45)$ [i.e., $A_0 \cos(\omega_{rf}(t))+A_0 \sin(\omega_{rf}(t))$]. The phase rotation of 45 degrees may be adjusted by scaling the signal transmitted by the first or second antenna and/or by using more than two antennas.

FIGS. 2A and 2B are diagrams of an example of probe signals 32 and 34. As shown, the first probe signal 32 has a pattern that, when converted to the frequency domain via a fast Fourier transform (FFT), provides a unique digital signal. The unique digital signal indicates that the received signal is a probe signal and may further indicate that it came for the first transceiver 12. Similarly, the second probe signal 34 has a pattern that, when converted to the frequency domain via an FFT, produces a unique digital signal. The unique digital signal indicates that the received signal is a probe signal and may further indicate that it came for the second transceiver 14.

In this example, the first probe signal 32 is received by the wireless communication device at time t1 and the second probe signal 34 is received at time t2. The wireless communication device 10 interprets the times t1 and t2 to produce a time difference Δt (e.g., t2−t1) and compares it to a delay threshold (e.g., the time of a wavelength of the probe signal). If the time difference compares unfavorably, the wireless communication device 10 generates an adjust signal that it provides to the first and/or second transceiver 12 and 14 or provides the times t1 and t2 to the first and/or second transcevier 12 and 14. If the time difference compares favorably to the delay threshold, the wireless communication device 10 tunes the first and/or second receiver section 16 and/or 18 to obtain a constructive interference.

FIGS. 3A and 3B are diagrams of another example of probe signals 32 and 34. In this example, the time difference Δt compares favorably to the delay threshold. In this example, the wireless communication device 10 tunes the first and/or second receiver section 16 and/or 18 to obtain a constructive interference. As such, the first and/or second signal 36 or 38 is phase shifted to align, in phase, the reception first and second signals 36 and 38. Thus, the same signal is received via two different inputs and may be combined to produce a more robust signal that is more reliably processed to cover data embedded in the signals 36 and 38.

Figure 4:
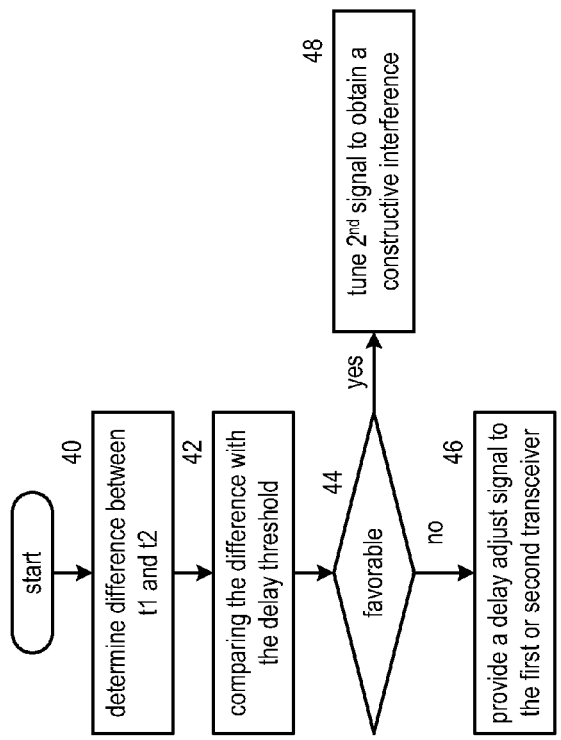
FIG. 4 is a logic diagram of an embodiment of a method in accordance with the present invention.

FIG. 4 is a logic diagram of an embodiment of a method that may be performed by the processing module 22 of the wireless communication device 10. The method begins at step 40 where the processing module 22 determines the difference between the time t1 and the time t2. The method continues at step 42 where the processing module 22 compares the difference with the delay threshold. If the comparison is favorable, the method branches from step 44 to step 48 and if the comparison is unfavorable, the method branches to step 44. At step 44, the processing module 22 provides a delay adjust signal to one of the first and second transceivers, wherein the delay adjust signal indicates the delta time. At step 48, the processing module 22 provides a tuning signal to the first or second receiver section 16 and/or 18 to tune the first or second signal to obtain a constructive interference with the other signal.

Figure 5:
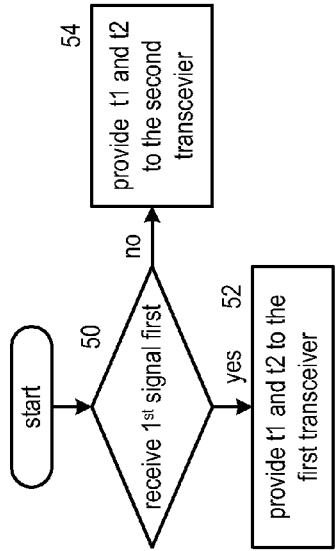
FIG. 5 is a logic diagram of another embodiment of a method in accordance with the present invention.

FIG. 5 is a logic diagram of another embodiment of a method that may be performed by the processing module 22 of the wireless communication device 10. The method begins at step 50 where the processing module 22 determines whether it receives the first or second probe signal first. If it receives the first probe signal first, the method continues at step 52 where the processing module 22 provides the time t1 and the time t2 to the first transceiver. If it receives the second probe signal first, the method continues at step 54 where the processing module 22 provides the time t1 and the time t2.

Figure 6:
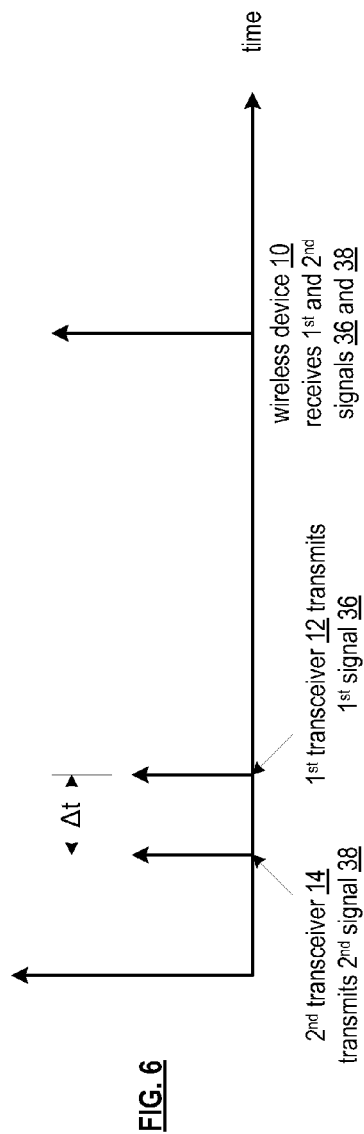
FIG. 6 is a diagram of an example of adjusting transmission of a first and second signal in accordance with the present invention.

FIG. 6 is a diagram of an example of adjusting transmission of a first and/or second signal 36 and/or 38 based on an adjust signal. In this example, the transmission time between the first transceiver 12 and the wireless communication device 10 is shorter than the transmission time between the second transceiver 14 and the wireless communication device 10. As such, the first transceiver 12 delays its transmission of the first signal 36 by delta t (e.g., Δt) such that the wireless communication device 10 receives the first and second signals 36 and 38 at substantially the same time. In addition, the wireless communication device 10 may further tune one of the first and second signals 36 and/or 38 to further improve time and/or phase alignment of the first and second signals.

Figure 7:
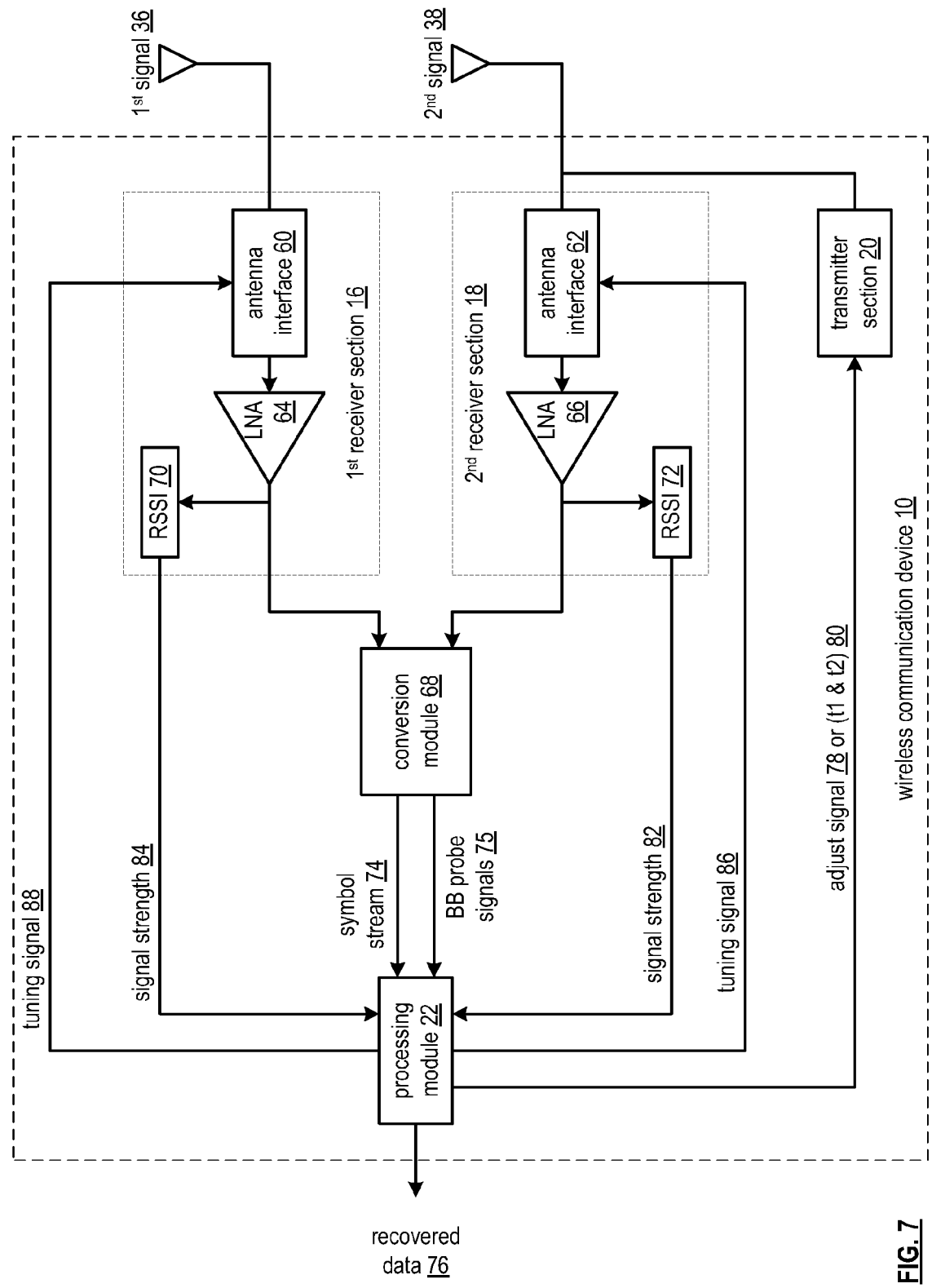
FIG. 7 is a schematic block diagram of an embodiment of a wireless communication device in accordance with the present invention.

FIG. 7 is a schematic block diagram of an embodiment of a wireless communication device 10 that includes the first receiver section 16, the second receiver section 18, the transmitter section 20, the processing module 22, and a conversion module 68. Each of the first and second receiver sections includes an antenna interface 60-62 (which may include one or more of a transmission line, an impedance matching circuit, and a transformer balun for one or more antennas), a low noise amplifier (LNA) 64-66, and may further include a received signal strength indicator (RSSI) 70-72.

In this embodiment, the $1^{st}$ receiver section 16 receives a first probe signal and the $2^{nd}$ receiver section 18 receives a second probe signal. The antenna interfaces 60 and 62 provide the respective probe signals to the LNAs 64 and 66 for amplification. The amplified first and second probe signals are provided to the conversion module 68 (embodiments of which will be described with reference to FIGS. 8 and 9). The conversion module 68 converts the first and second amplified probe signals into first and second baseband probe signals 75.

The processing module 22 interprets the first and second baseband probe signals 75 to determine the first and second times t1 and t2. The processing module 22 determines whether a difference between the times t1 and t2 compares favorably to a delay threshold. If yes, the processing module 22 generates a first tuning signal 86 and/or a second tuning signal 88 based on the first and second times t1 and t2. For example, if the inbound and outbound RF signals are in the 5 GHz frequency band, the wavelength ($\lambda$) of a 5 GHz signal is 6 centimeters; thus, the period of a 5 GHz signal is 200 pico Seconds (e.g., $\lambda/c$). In this example, if the time difference is less than 200 pico Seconds (e.g., period of one cycle), the processing module 22 generates the first and/or second tuning signal 86 and/or 88. Another example of this was provided with reference to FIGS. 3A and 3B.

The processing module 22 provides the first tuning signal 86 to the $2^{nd}$ receiver section 18 (e.g., to the antenna interface 62 or to a phase rotation module coupled in series with the LNA 66) and/or provides the second tuning signal 88 to the $1^{st}$ receiver section 16 (e.g., to the antenna interface 60 or to a phase rotation module coupled in series with the LNA 64). In this instance, one or more of the receiver sections 16 and/or 18 is adjusted based on the tuning signal 86 and/or 86 to adjust phase of inbound RF signals (e.g., signals 36 and/or 38) such that constructive interference of the inbound signals 36 and/or 38 is achieved. Alternatively, the processing module 22 may perform phase adjustment at baseband on the inbound symbol stream 74 based on one or more of the tuning signals 86 and/or 88.

When the time difference compares unfavorably to the delay threshold, the processing module 22 generates an adjust signal 78, which is transmitted to the first or second transcevier via the transmitter section 20. The adjust signal 78 indicates a delay time that the first or second transcevier should delay transmission of upcoming signals 36 and/or 38. An example of this was shown in FIG. 6. Alternatively, the processing module 22 may provide the times t1 and t2 to the transmitter section 20 for transmission to the first or second transceiver.

Once the set up process is complete (e.g., generation of the tuning signals, the adjust signal, or transmission of t1 and t2), the wireless communication device 10 receives the first and second signals 36 and 38. In an embodiment, the first and second signals 36 and 38 are received at substantially the same time in accordance with the adjust signal 78 or in absence of the adjust signal 78 when the time difference compares favorably to the delay threshold. The received signals 36 and 38 may be phase adjusted by the first and second receiver sections 16 and/or 18 in accordance with the tuning signals 86 and/or 88.

The LNAs 64 and 66 amplify the first and second signals 36 and 38, respectively, and provided the amplified signals to the conversion module 68. In addition, the RSSI modules 70 and 72 may measure the signal strength of the first and second signals 36 and 38 and provide the RSSI values to the processing module 22.

The conversion module 68 converts the first and second signals 36 and 38 into one or more symbol streams 74. The one or more symbol streams 74 may be formatted in accordance with a wireless communication protocol (e.g., GSM, CDMA, EDGE, GPRS, WCDMA, high-speed downlink packet access (HSDPA), high-speed uplink packet access (HSUPA), etc.) being supported by the wireless communication device 10. For example, the conversion module 68 may produce a symbol stream corresponding to the first signal 36 and another symbol stream corresponding to the second signal 38 or may a combined symbol stream of the first and second signals 36 and 38.

The processing module 22 converts the one or more symbol streams 74 into recovered data 76 in accordance with the wireless protocol. For example, the processing module 22 may perform one or more of fast Fourier transform (FFT), demapping, deinterleaving, descrambling, decoding, guard interval removal, and low IF to baseband conversion. When the processing module 22 receives two symbol streams 74 (e.g., one for the first signal 36 and the second for the second signal 38), the processing module 22 may combine the symbol streams at any stage of the conversion process. Further, the processing module 22 may utilize the signal strength measurements 82 and 84 to select one of the symbol streams to process when the signal strength of the first or second signal 36 or 38 is much greater (e.g., at least 6 dB greater) than the other signal.

Figure 8:
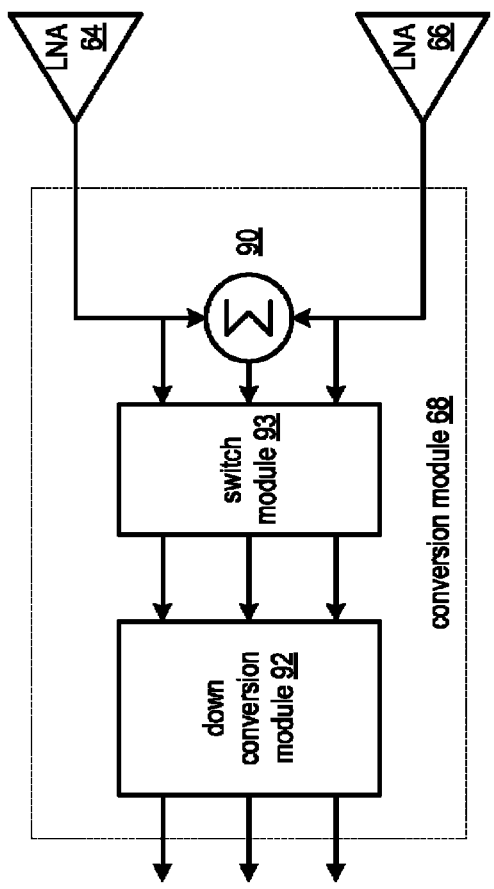
FIG. 8 is a schematic block diagram of an embodiment of a conversion module in accordance with the present invention.

FIG. 8 is a schematic block diagram of an embodiment of a conversion module 68 that includes a summing module 90, a switching module 93, and a down conversion module 92. When the receiver sections 16 and 18 receive the first and second probe signals 32 and 34, the switching module 93 (which may be a plurality of switches, transistors, multiplexers, demultiplexer, etc.) provides the first and second probe signals 32 and 34 to the down conversion module 92. The down conversion module 92, which may include one or more mixers that mix the probe signal with a local oscillation, low pass filter, bandpass filters, and/or may further include a gain stage, converts the first probe signal 32 into the first baseband probe signal 75 and converts the second probe signal 34 into the second baseband probe signal 75.

When the receiver sections 16 and 18 receive the first and second signals 36 and 38, the summing module 90 sums the first and second signals 36 and 38 to produce an RF summed signal. The switching module 93 provides the RF summed signal tot the down conversion module 92, which converts it into the symbol stream 74.

Figure 9:
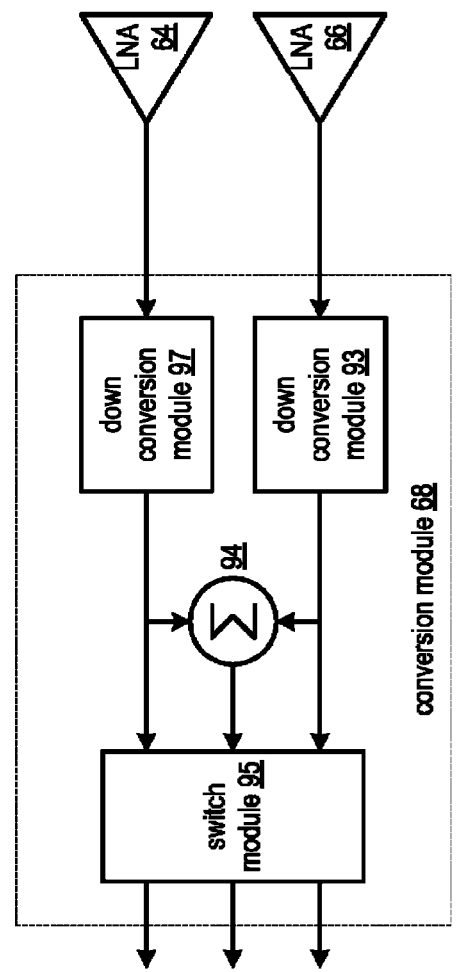
FIG. 9 is a schematic block diagram of another embodiment of a conversion module in accordance with the present invention.

FIG. 9 is a schematic block diagram of another embodiment of a conversion module 68 that includes a summing module 94, a switching module 95, and a plurality of down conversion modules 93, 97. When the receiver sections 16 and 18 receive the first and second probe signals 32 and 34, the first down conversion module 97 converts the first probe signal into a first baseband probe signal 75 and the second down conversion module 93 converts the second probe signal into the second baseband probe signal 75. Note each of the down conversion modules 93 and 97 may include one or more mixers that mix the probe signal with a local oscillation, low pass filter, bandpass filters, and/or may further include a gain stage.

The switching module 95 provides the first and second baseband probe signals 75 to the processing module 22. The switching module 95 may include a plurality of switches, transistors, multiplexers, demultiplexer, etc.

When the receiver sections 16 and 18 receive the first and second signals 36 and 38, the first down conversion module 97 converts the first signal 36 into a first symbol stream and the second down conversion module 93 converts the second signal 38 into a second symbol stream. The summing module 94 sums the first and second symbol streams to produce the symbol stream 74. In an alternate embodiment, the switching module 95 provides the first and second symbol streams as the symbol stream 74 to the processing module 22. In this embodiment, the processing module 22 combines the symbol streams or selects one of them for processing.

Figure 10:
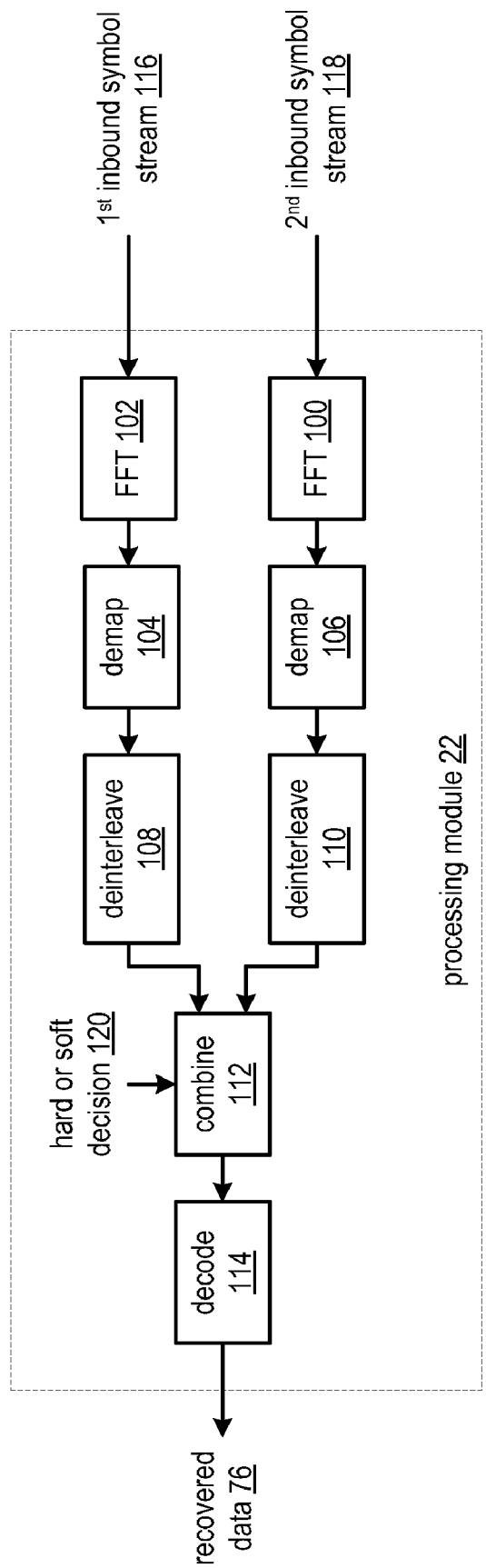
FIG. 10 is a schematic block diagram of an embodiment of a processing module in accordance with the present invention.

FIG. 10 is a schematic block diagram of an embodiment of the processing module 22 coupled to receive the first and second inbound symbol streams 116 and 118 (e.g., the first and second symbol streams 74 of FIGS. 6-9). The processing module 22 is configured to include a plurality of FF modules 100-102, a plurality of demapping modules 104-106, a plurality of deinterleaving modules 108-110, a combining module 112, and a decoding module 114. Note that the processing module 22 may include more or less stages of baseband processes as shown in the present figure. Further note that the combining module may be positioned before the FFT modules 100-102, after the FFT modules 100-102, after the demapping modules 104-106, or after the decoding module 114. In this example, the elements after the combining module 112 would be a single stream.

The FFT modules 100-102 perform a fast Fourier transform on the first and second inbound symbol streams 116 and 118 to convert the symbol streams from the digital time domain to the digital frequency domain. The demapping modules 104-106 demap the frequency domain symbols to produce demapped symbol streams. The deinterleaving modules 108-110 deinterleave the demapped symbol streams to produce deinterleaved symbol streams.

The combining module 112 combines the deinterleaved symbol streams based on a hard decision or a soft decision process 120. In an embodiment, the hard decision process causes the combining module 112 to select one of the deinterleaved symbol streams based on the symbol stream most likely to produce the least amount of errors. In another embodiment, the soft decision process causes the combining module 112 to weight each bit of the symbol streams based on channel characteristics of the channels on which the first and second signals were received. The weighted bits may be combined or individually selected to produce a combined symbol stream. The decoding module 114, which may be a Viterbi decoder, decodes the combined symbol stream to produce the recovered data 76.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A method comprises:
receiving a first probe signal from a first transceiver at time t1, wherein the first probe signal has a first carrier frequency;
receiving a second probe signal from a second transceiver at time t2, wherein the second probe signal has a second carrier frequency that is substantially similar to the first carrier frequency;
determining a difference between time t1 and time t2;
comparing the difference between time t1 and time t2 to a delay threshold;
when the difference between time t1 and time t2 compares favorably to the delay threshold, receiving a first signal from the first transceiver and receiving a second signal from the second transceiver, and tuning one of the first or second signals to obtain a constructive interference combining the first and second signals; and
when the difference between time t1 and time t2 compares unfavorably to the delay threshold, determining which of the first or second probe signal was received first and providing the difference to the corresponding first or second transceiver having the probe signal received first, in order to delay transmission from the corresponding first or second transceiver having the probe signal received first by the difference between time t1 and time t2, such that transmissions of the first and second signals from the first and second transceivers combine in a constructive interference upon reception after adjusting for the delay in transmission.

2. The method of claim 1, wherein providing the difference to the corresponding first or second transceiver further comprises:
sending a delay adjust signal to the corresponding first or second transceiver having the probe signal received first.

3. The method of claim 1, wherein providing the difference to the corresponding first or second transceiver further comprises:
providing time t1 and time t2 to the first transceiver when the first probe signal is received prior to the second probe signal; and
providing time t1 and time t2 to the second transceiver when the second probe signal is received prior to the first probe signal.

4. The method of claim 1 further comprises at least one of:
the first and second transceivers including first and second access points in a wireless local area network;
the first and second transceivers including first and second piconet transceivers.

5. The method of claim 1 further comprises:
combining the first and second signals to produce a combined signal;
converting the combined signal into a symbol stream; and
converting the symbol stream into recovered data.

6. The method of claim 1 further comprises:
determining a first signal strength of the first signal and a second signal strength of the second signal;
comparing a difference between the first and second signal strengths with a signal strength threshold; and
when the difference between the first and second signal strengths compares unfavorably with the signal strength threshold, processing the first or the second signal.

7. The method of claim 1 further comprises:
converting the first signal into a first symbol stream;
converting the second signal into a second symbol stream; and
processing the first and second symbol streams into inbound data.

8. The method of claim 7, wherein the processing the first and second symbol streams comprises at least one of:
utilizing a hard decision processing scheme to produce the inbound data from the first or the second symbol stream; and
utilizing a soft decision processing scheme to produce the inbound data from the first and the second symbol streams.

9. A wireless communication device comprises:
a first receiver section to receive a first probe signal from a first transceiver at time t1, wherein the first probe signal has a first carrier frequency, and the first receiver section to also receive a first signal from the first transceiver;
a second receiver section for receiving a second probe signal from a second transceiver at time t2, wherein the second probe signal has a second carrier frequency that is substantially similar to the first carrier frequency, and the second receiver section to also receive a second signal from the second transceiver; and
a processing module coupled to the first and second receiver sections, wherein the processing module to:
determine a difference between time t1 and time t2;
compare the difference between time t1 and time t2 to a delay threshold;
when the difference between time t1 and time t2 compares favorably to the delay threshold, receive the first signal from the first transceiver and receive the second signal from the second transceiver, and tune one of the first or second signals to obtain a constructive interference combining the first and second signals; and
when the difference between time t1 and time t2 compares unfavorably to the delay threshold, determine which of the first or second probe signal was received first and provide the difference to the corresponding first or second transceiver having the probe signal received first, in order to delay transmission from the corresponding first or second transceiver having the probe signal received first by the difference between time t1 and time t2, such that transmissions of the first and second signals from the first and second transceivers combine in a constructive interference upon reception by the first and second receiver sections after adjusting for the delay in transmission.

10. The wireless communication device of claim 9 further comprises:
a transmitter section, coupled to the processing module, to transmit to the corresponding first or second transceiver a delay adjusted signal, in order to provide the difference to the corresponding first or second transceiver.

11. The wireless communication device of claim 9 further comprises:
a transmitter section, coupled to the processing module, to provide time t1 and time t2 to the first transceiver when the first probe signal is received prior to the second probe signal, and to provide time t1 and time t2 to the second transceiver when the second probe signal is received prior to the first probe signal, in order to provide the difference to the corresponding first or second transceiver.

12. The wireless communication device of claim 9 further comprises:
a conversion module coupled to produce a symbol stream from the first and second signals; and
the processing module coupled to convert the symbol stream into recovered data.

13. The wireless communication device of claim 9, wherein the processing module is coupled to:
determine a first signal strength of the first signal and a second signal strength of the second signal;
compare a difference between the first and second signal strengths with a signal strength threshold; and
when the difference between the first and second signal strengths compares unfavorably with the signal strength threshold, process the first or the second signal.

14. The wireless communication device of claim 9 further comprises:
a first down conversion module coupled to convert the first signal into a first symbol stream;
a second down conversion module coupled to convert the second signal into a second symbol stream; and
the processing module coupled to process the first and second symbol streams into inbound data.

15. The wireless communication device of claim 14, wherein the processing module to process the first and second symbol streams by at least one of:
utilizing a hard decision processing scheme to produce the inbound data from the first or the second symbol stream; and
utilizing a soft decision processing scheme to produce the inbound data from the first and the second symbol streams.

* * * * *